US009094267B2

(12) United States Patent
Cariou et al.

(10) Patent No.: US 9,094,267 B2
(45) Date of Patent: Jul. 28, 2015

(54) METHOD OF TRANSMITTING AND RECEIVING A MULTI-CARRIER SIGNAL, AND A TRANSMITTER, A RECEIVER, A SIGNAL, AND A COMPUTER PROGRAM CORRESPONDING THERETO

(75) Inventors: Laurent Cariou, Rennes (FR); Moussa Diallo, Cesson Sevigne (FR)

(73) Assignee: Orange, Paris (FR)

( * ) Notice: Subject to any disclaimer, the term of this patent is extended or adjusted under 35 U.S.C. 154(b) by 141 days.

(21) Appl. No.: 13/695,871

(22) PCT Filed: May 6, 2011

(86) PCT No.: PCT/FR2011/051027
§ 371 (c)(1),
(2), (4) Date: Nov. 2, 2012

(87) PCT Pub. No.: WO2011/141665
PCT Pub. Date: Nov. 17, 2011

(65) Prior Publication Data
US 2013/0051242 A1    Feb. 28, 2013

(30) Foreign Application Priority Data
May 11, 2010 (FR) ..................... 10 53695

(51) Int. Cl.
H04W 24/00     (2009.01)
H04L 27/26     (2006.01)
H04B 7/06      (2006.01)
H04L 25/02     (2006.01)

(52) U.S. Cl.
CPC .......... *H04L 27/2601* (2013.01); *H04B 7/0626* (2013.01); *H04L 25/0206* (2013.01)

(58) Field of Classification Search
None
See application file for complete search history.

(56) References Cited

U.S. PATENT DOCUMENTS

| 2007/0189408 | A1  | 8/2007 | Waxman |
| 2009/0175374 | A1* | 7/2009 | Seki et al. ..................... 375/260 |
| 2010/0246512 | A1* | 9/2010 | Kawamura et al. ........... 370/329 |
| 2013/0051242 | A1* | 2/2013 | Cariou et al. ................. 370/241 |
| 2013/0229941 | A1* | 9/2013 | Huang et al. ................. 370/252 |

FOREIGN PATENT DOCUMENTS

| WO | WO 2007/103085 A2 | 9/2007 |
| WO | WO 2007/109472 A1 | 9/2007 |
| WO | WO 2008/036670 A2 | 3/2008 |

OTHER PUBLICATIONS

Choi et al., "Circuit Implications of MIMO Technology for Advanced Wireless Local Area Networks," Radio Frequency Integrated Circuits (RFIC) Symposium, 2005, Digest of Papers, 2005 IEEE, Piscataway, NJ, USA, pp. 185-188 (Jun. 12, 2005).
802 11 Working Group, "IEEE 802.11n Part 11: Wireless LAN Medium Access Control (MAC) and Physical Layer (PHY) specifications: Enhancements for Higher Throughput," IEEE P802.11N/D1.0, pp. 119-125 (Mar. 1, 2006).

* cited by examiner

*Primary Examiner* — Chi H Pham
*Assistant Examiner* — Shick Hom
(74) *Attorney, Agent, or Firm* — Drinker Biddle & Reath LLP

(57) ABSTRACT

A method of transmitting a multi-carrier signal by a transmitter uses at least two transmit antennas to at least one receiver using at least one receive antenna. At least one estimate of at least one transmission downlink channel is obtained. A transmission stage performs at least one iteration of the following steps, for at least one downlink channel: transmitting payload data over the downlink channel, while taking account of the downlink channel estimate; and updating the downlink channel estimate, while taking account of acknowledgment information transmitted by the receiver associated with the downlink channel and acknowledging reception of the payload data.

10 Claims, 4 Drawing Sheets

40MHz DL

2x20MHz UL ACK

METHOD OF TRANSMITTING AND RECEIVING A MULTI-CARRIER SIGNAL, AND A TRANSMITTER, A RECEIVER, A SIGNAL, AND A COMPUTER PROGRAM CORRESPONDING THERETO

CROSS-REFERENCE TO RELATED APPLICATIONS

This application is the U.S. national phase of the International Patent Application No. PCT/FR2011/051027 filed May 6, 2011, which claims the benefit of French Application No. 1053695 filed May 11, 2010, the entire content of which is incorporated herein by reference.

1. FIELD

The field of the invention is that of digital communications, and more precisely communications requiring knowledge about the channel used for transmission in environments that present a small amount of variation in the channel.

More precisely, the invention relates to transmitting and receiving a multi-carrier signal, in which the transmitter can obtain an estimate of the transmission channel from information returned in a return signal coming from the receiver, also known as feedback.

The invention finds applications in particular in single-user multiple-input multiple-output (MIMO) type transmission systems, e.g. making use of beamforming, or multi-user systems, e.g. making use of a technique of the space-division multiple access (SDMA) type.

In particular, the invention finds applications in transmission systems in compliance with the standard IEEE 802.11n, and in particular with future versions thereof.

2. BACKGROUND

Transmission techniques requiring knowledge about the channel used for transmission comprise two stages, as shown in FIG. 1 for an SDMA technique: a stage F of estimating the channel by recovering information about the channel by feedback, without transmitting payload data, and a stage T of transmitting payload data.

During the feedback stage, the transmitter, e.g. an access point AP, sends a packet having pilots, referred to as a "sounding" packet, to stations (STA#1, STA#2) that can estimate the downlink channel DL. These stations then encode information about the estimated channel, written CSI_DL, and transmit that information to the access point AP in a frame written "CSI report". That mode of channel estimation is sometimes referred to as "explicit feedback".

During the transmission stage, the access point AP sends one or more payload data packets "DL-MU-MIMO" to a plurality of users, e.g. by making use of a particular beam towards each user. FIG. 1 shows a base element, i.e. a payload data transmission packet, followed by acknowledgments of the reception of the payload data, which acknowledgments are transmitted by the users. The base element may be duplicated as often as desired, so long as the channel does not vary. This variation over time in the channel thus determines the duration of a transmission stage. Thus, if the channel varies sufficiently over 25 milliseconds (ms) for the SDMA technique to cease functioning, e.g. because interference between users has become too strong, then the duration of a transmission stage must be less than 25 ms.

At the end of a transmission stage, a new feedback stage is performed in order to obtain an up-to-date estimate of the transmission channel.

It should thus be observed that the longer the payload data transmission stage, the greater the overall transmission data rate.

Nevertheless, as mentioned above, the length of the second stage is constrained by variations in the channel over time, due to movements of the transmitter or of the receiver, or merely to certain movements in the environment.

For example, the beam-forming technique of the standard 802.11n that serves to focus the transmission power towards a particular receiver and thus increase the signal-to-noise ratio on reception, performs a feedback stage once every 100 ms in open space and when there is no movement of the transmitters and/or receivers.

In the same environment, when using the multi-user SDMA technique, this period for performing the feedback stage is shortened to 25 ms.

Since the period for performing the feedback stage has great influence on the overall transmission data rate, it is important to lengthen it as much as possible, i.e. to increase the duration of the transmission stage between two feedback stages.

Several techniques exist for modifying the ratio between the durations of the feedback and transmission stages for the purpose of optimizing the overall transmission data rate.

A first category of techniques consists in reducing the duration of the feedback stage by compressing the channel information. Nevertheless, such compression is often detrimental to transmission quality.

A second category of techniques consists in lengthening the duration of the transmission stage.

For example, with the SDMA technique, an access point AP having four antennas can transmit simultaneously on the same frequency band to four users/receivers, by forming a beam towards each user so as to eliminate interference between users. The beams are calculated on the basis of the channel information for each user.

Under ideal circumstances, each user receives only the information addressed to that user, i.e. one space-divided stream from among the four space-divided streams sent by the access point.

In a first mode, the access point thus sends to each user only the pilot symbols needed for estimating the channel of the space-division stream addressed to that user.

Nevertheless, for various reasons, including for example variation of the channel over time, a user may receive information addressed to that user together with interference from information addressed to other users.

If a user possesses more receive antennas than the number of space-divided streams that are addressed to that user, it is possible for the user to eliminate some or all of the information by interference canceling techniques (such as the minimum mean square error (MMSE) technique). Nevertheless, this is possible only if the user is capable of estimating the channels of the space-divided streams addressed to the other users.

In a second mode, in order to able to eliminate all or some of the interference, the access point thus transmits to each user both the symbols enabling the user to estimate the channel for the space-divided stream addressed to that user, and also pilot symbols enabling each user to estimate the channels for the space-divided streams addressed to the other users. This second mode makes it possible to be more robust in the face of channel variations over time, since it enables the interference generated thereby to be canceled. Naturally, as soon as the interference becomes excessive, it is necessary to perform a new feedback stage.

Nevertheless, a drawback of interference canceling techniques lies in the need to transmit more pilot symbols to each user, thereby reducing the efficiency of the physical layer of the transmission system.

Another drawback of those techniques is due to the fact that, at user level, it is necessary to have at least one more antenna than there are space-divided streams to receive. This gives rise to greater complexity and greater cost at receiver level. Insofar as the receivers are more and more frequently mobile stations, this drawback can become very considerable.

There therefore exists a need for a novel transmission and/or reception technique for use in transmission systems that require knowledge about the channel at the time of transmission in order to optimize the duration of the transmission stage between two feedback stages.

3. SUMMARY

The invention proposes a novel solution to this problem in the form of a method of transmitting a multi-carrier signal by a transmitter using at least two transmit antennas to at least one receiver using at least one receive antenna, the method comprising an obtaining step of obtaining an estimate of at least one transmission downlink channel, where a downlink channel is defined between the transmit antennas and the receive antenna(s).

According to the invention, such a method includes a transmission stage performing at least one iteration of the following steps, for at least one downlink channel:

transmitting payload data over the downlink channel, while taking account of the downlink channel estimate; and updating the downlink channel estimate, while taking account of acknowledgment information acknowledging reception of the payload data and transmitted by the receiver associated with the downlink channel.

Thus, during the stage of transmitting payload data, the invention proposes updating an "initial" estimate of the downlink channel, as made using a conventional channel estimation technique, e.g. a so-called "explicit feedback" technique, described above with reference to the prior art, or a so-called "implicit feedback" technique, by making use of an estimate of the uplink channel and converting that estimate into downlink channel information. The "implicit feedback" technique relies on the fact that the channel is reciprocal, i.e. it can be estimated identically in one direction or in the other, and therefore proposes estimating the channel in the uplink direction. The advantage of this technique is that channel estimation is performed at the transmitter and not at the receiver. There is therefore no need for a channel estimate to be transmitted over the return path. Nevertheless, the reciprocity of the channel is valid only for transmission between the antennas and not for the signal passing through the analog components at the transmitter and at the receiver. Calibration is therefore needed to convert the estimate made in the uplink direction into an estimate representative of the downlink direction.

In contrast, prior art techniques rely on two distinct stages, one of feedback and the other of transmitting payload data, with only the feedback stage enabling the downlink channel to be estimated.

By acting in this way during the transmission stage, to update the estimate of the channel as obtained initially in conventional manner during the feedback stage, the invention enables the duration of the transmission stage between two feedback stages to be lengthened.

The updated channel estimate is taken into account progressively by the transmitter (e.g. an access point) while transmitting payload data during the transmission of the payload data, thus making it possible to take account of variations over time in the channel, and not only of the initial estimate of the channel as obtained during the feedback stage.

Thus, as transmission progresses, the estimate of the channel as previously updated in accordance with the invention is updated once again, on the basis of new acknowledgment information transmitted by the receiver associated with the channel. The invention thus makes it possible to update the channel estimate iteratively and progressively while payload data is being transmitted.

Furthermore, by making use of acknowledgment information that is transmitted by a receiver, and that is necessary for the operation of such a transmission system, the invention does not require any additional signals to be used. For example, the acknowledgment information corresponds to an acknowledgment frame of a data link layer, known as the MAC layer.

When there are a plurality of receivers, the invention makes it possible to update the estimates of the downlink channels associated with those receivers, by using the acknowledgment information as transmitted by each receiver.

In a particular implementation of the invention, the updating step comprises the following substeps:

receiving the acknowledgment information;

estimating the uplink channel corresponding to the downlink channel on the basis of the acknowledgment information; and updating the downlink channel estimate on the basis of the uplink channel estimate.

Thus, the invention makes it possible to update the estimate of a downlink channel from an estimate of an uplink channel obtained from the useful data acknowledgment information as transmitted by a receiver, and thus without any need to use additional signals.

For this purpose, the first iteration of the transmission stage performs a step of determining a calibration factor by comparing the estimate of the downlink channel as obtained during the obtaining step with the estimate of the uplink channel corresponding to the downlink channel. Furthermore, the updating step also takes account of the calibration factor.

Thus, by taking account of a calibration factor representative of the differences between the analog components used in reception and in transmission, the invention makes it possible to determine an updated estimate of the downlink channel that is reliable on the basis of an estimate of the corresponding uplink channel.

The calibration factor obtained after a first transmission of payload data and thus after receiving first acknowledgment information transmitted by a receiver, makes it possible to take account of the analog components used in reception and in transmission, which components are not involved in the reciprocity of the channel. It is only transmission through the air that is identical, both in reception and in transmission.

In a particular implementation of the invention, in which a receiver has only one receive antenna, the step of estimating the uplink channel uses at least one pilot transmitted by the acknowledgment information. Under such circumstances, there is only one downlink channel, and only one corresponding uplink channel, between the transmitter and the receiver.

Thus, the invention makes use of the pilots that are conventionally transmitted with the information acknowledging receipt of payload data transmitted over a downlink channel, e.g. in a channel estimation packet (L_LTF) of an acknowledgment frame of the MAC layer, in order to estimate the uplink channel corresponding to the downlink channel.

In another particular implementation of the invention, in which a receiver includes at least two receive antennas and in which the acknowledgment is received in the form of an acknowledgment frame of the MAC layer, including a channel estimate packet (L_LTF) carrying two sets of pilots, each associated with a distinct receive antenna of the receiver, the step of estimating the uplink channel is performed for each of the uplink channels on the basis of the set of pilots associated with the uplink channel.

Thus, using acknowledgment information having a single channel estimate packet, the invention makes it possible to estimate each uplink channel associated with each antenna of the receiver. The acknowledgment information under such circumstances includes sets of pilots each associated with a respective uplink channel, and on receiving this acknowledgment information the transmitter is capable of distinguishing the sets of pilots associated with each of the uplink channels in order to estimate each of those uplink channels.

In another particular implementation of the invention, the acknowledgment information is received in the form of an acknowledgment frame of the MAC layer, including a distinct channel estimate packet associated with each receive antenna of said receiver (HT_LTF1 and HT_LTF2). The uplink channel estimation step is then performed for each of the uplink channels on the basis of the channel estimate packet associated with the receive antenna defining the uplink channel.

The invention thus makes it possible on the basis of acknowledgment information comprising a plurality of channel estimate packets (e.g. one for each channel associated with each antenna of the receiver), to estimate each uplink channel associated with each antenna of the receiver. When the transmitter receives the acknowledgment information, it is capable of estimating each of the uplink channels on the basis of distinct associated channel estimate packets.

In a particular aspect of the invention, the step of estimating the uplink channel delivers an estimate of a first portion of the frequency response of the uplink channel, and the transmission method includes a step of frequency and/or time interpolation enabling a second portion of the frequency response to be estimated from the first portion.

Thus, in certain situations, e.g. when the payload data is not transmitted over the same frequency band as the acknowledgment information, acknowledgment information does not enable the entire frequency response of the uplink channel to be estimated. The invention then makes it possible to obtain this full estimate of the frequency response of the uplink channel by making use of frequency interpolation, possibly associated with time interpolation, on the basis of the portion of the frequency response that is estimated from the acknowledgment information.

The invention also provides a transmitter for transmitting a multi-carrier signal to at least one receiver using at least one receive antenna, the transmitter using at least two transmit antennas and including means for obtaining an estimate of at least one transmission downlink channel, where a downlink channel is defined between one of the transmit antennas and the or one of the receive antennas.

According to the invention, such a transmitter also includes the following means, activated at least once for at least one downlink channel in the form of one iteration:

means for transmitting payload data over the downlink channel, taking account of the downlink channel estimate; and means for updating the downlink channel estimate by taking account of acknowledgment information acknowledging reception of the payload data and transmitted by the receiver associated with the downlink channel.

Such a transmitter is adapted in particular to perform the above-described transmission method. By way of example it may be an access point of a WiFi network.

Another aspect of the invention provides a reception method for receiving a signal corresponding to a multi-carrier signal transmitted by a transmitter using at least two transmit antennas and received by a receiver using at least two receive antennas.

According to the invention, such a reception method includes at least one iteration of the following steps for at least two downlink channels, where a downlink channel is defined between one of the transmit antennas and one of the receive antennas:

receiving payload data on the downlink channels; and generating and transmitting acknowledgment information acknowledging reception of the payload data and enabling the transmitter to estimate the uplink channels corresponding to the downlink channels.

Thus, the invention makes it possible to estimate the uplink channels corresponding to the antennas of a receiver, by making use of acknowledgment information that is needed for the operation of such a transmission system and that is generated and transmitted by the receiver, and thus without requiring any additional signals.

For example, in a particular implementation of the invention, the generation step generates acknowledgment information in the form of an acknowledgment frame of a data link layer known as the MAC layer, and including a channel (L_LTF) estimate packet having at least two sets of pilots, each associated with a distinct receive antenna of said receiver.

In a particular aspect of this implementation, the pilots of the sets of pilots are arranged in such a manner that, during the step of transmitting acknowledgment information, a pilot at a given frequency is transmitted at any given instant by a single one of the receive antennas.

At the access point, since the sets of pilots associated with the antennas are orthogonal, they are detected individually so as to make it possible to estimate each of the uplink channels.

Thus, acknowledgment information including a single channel estimate packet makes it possible to estimate each uplink channel associated with each antenna of the receiver.

In a second implementation, the generation step generates acknowledgment information in the form of an acknowledgment frame of a data link layer known as the MAC layer, including a distinct channel estimate packet associated with each receive antenna of said receiver (HT_LTF1 and HT_LTF2).

Thus, acknowledgment information comprises a plurality of channel estimate packets (e.g. one for each channel associated with each antenna of the receiver), each packet making it possible to estimate the corresponding uplink channel.

It should be observed that in this implementation, compatibility with earlier standards is retained when the "conventional" channel estimate packet (L-LTF) is nevertheless transmitted in addition to the packets associated with each receiver antenna of the receiver (HT_LTF1 and HT_LTF2).

In a particular aspect of the invention, the generation step generates acknowledgment information in the form of an acknowledgment frame of a data link layer known as the MAC layer, and the transmission step transmits at least a first portion of the acknowledgment frame over a 40 Megahertz (MHz) frequency band, and transmits a second portion of the acknowledgment frame over two 20 MHz frequency bands, where appropriate.

Thus, certain situations, e.g. in which the payload data is not transmitted over the same frequency band as the acknowledgment information, are processed in a special manner so that the estimate of each uplink channel can be made without requiring frequency and/or time interpolation at the access point.

In these situations, a first solution consists in sending the acknowledgment frame over the same frequency band as the payload data.

A second solution consists in sending only a portion (first portion) of the acknowledgment frame over the same frequency band as the useful data, thereby enabling the channel to be estimated, and also maximizing compatibility with existing stations and earlier standards.

For example, the first portion may correspond to at least one channel estimation packet.

The invention also provides a receiver for receiving a signal corresponding to a multi-carrier signal transmitted by a transmitter using at least two transmit antennas, the receiver using at least two receive antennas.

According to the invention, such a receiver comprises the following means that are activated in the form of an iteration at least once for at least two downlink channels, where a downlink channel is defined between one of the transmit antennas and one of the receive antennas:

means for receiving payload data on the downlink channels; and means for generating and means for transmitting acknowledgment information acknowledging reception of the payload data making it possible for the transmitter to estimate uplink channels corresponding to the downlink channels.

Such a receiver is adapted in particular to perform the above-described reception method. By way of example, it may be a station providing a set of basic services in a WiFi network.

The receiver may naturally include the various characteristics relating to the reception method of the invention. Thus, the characteristics and advantages of the receiver are the same as the characteristics and advantages of the reception method, and they are not described in greater detail.

Another aspect of the invention provides an acknowledgment signal transmitted by a receiver using at least two receive antennas, the signal being addressed to a transmitter using at least two transmit antennas.

According to the invention, such an acknowledgment signal carries acknowledgment information acknowledging reception of payload data transmitted by the transmitter via at least two downlink channels, a downlink channel being defined between one of the transmit antennas and one of the receive antennas, the information acknowledging reception of payload data enabling the transmitter to estimate uplink channels corresponding to the downlink channels.

The transmission and reception methods of the invention can be implemented in various ways, in particular in hard-wired form or in software form.

In another aspect, the invention provides a computer program including instructions adapted to implementing the transmission method and/or the reception method described above when the program is executed by a processor. Such a program may use any programming language. It may be downloaded from a communications network and/or it may be recorded on a computer-readable medium.

4. BRIEF DESCRIPTION OF THE DRAWINGS

Other characteristics and advantages of the invention appear more clearly on reading the following description of a particular implementation given merely by way of illustrative and non-limiting example, and the accompanying drawings, in which.

5. DETAILED DESCRIPTION

5.1 General Principles

The invention lies in the context of transmission requiring knowledge about the transmission channel at the time of transmission, in environments that present a small amount of variation in the channel. Conventionally, this channel knowledge at the time of transmission is obtained by an estimate of the channel as obtained during a feedback stage prior to transmitting data, which stage is performed periodically in order to be able to take variations of the channel into account.

The general principle of the invention relies on acting during data transmission to update the estimate of the downlink channel between a transmitter and a receiver, thereby making it possible to optimize the duration of the transmission stage between two feedback stages.

To do this, the invention uses acknowledgment information transmitted by the receiver for acknowledging reception of payload data transmitted by the transmitter in order to update the estimate of the downlink channel.

Thus, since the channel estimate is updated during the payload data transmission stage, the duration of the transmission stage can be lengthened, before it is necessary to implement a new feedback stage, since the transmission of payload data takes account of the newly-updated channel estimate.

In this way, the invention makes it possible to optimize the ratio between the duration of the feedback stage and the duration of the transmission stage, thereby optimizing the total transmission data rate.

5.2 Description of an Implementation

Figure 2:
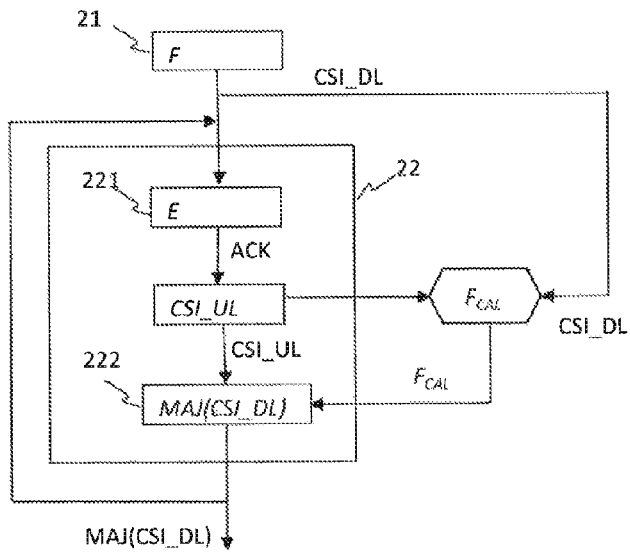
FIG. 2 shows the main steps of the transmission method in an implementation of the invention.

There follows a description with referenced to FIG. 2 of the main steps of the transmission method in an implementation of the invention.

Consideration is given to a transmission system comprising a transmitter using at least two transmit antennas and at least one receiver using at least one receive antenna.

In this implementation of the invention, the transmission method comprises for at least one downlink channel between an antenna of the transmitter and an antenna of the receiver, a step 21 of obtaining an estimate CSI_DL of the downlink channel. This step 21 is implemented for example using a conventional channel estimation technique, e.g. a so-called "explicit feedback" technique, as described above with reference to the prior art, or a so-called "implicit feedback" technique, using an uplink channel estimate and converting that estimate into downlink channel information. By way of example, this step 21 corresponds to the above-described feedback stage F.

This channel estimate CSI_DL as initially obtained is subsequently updated during a transmission stage 22 performing each of the steps 221 and 222 as described below at least once.

Firstly, a step 221 of payload data transmission E is performed, taking account of the channel estimate CSI_DL (as initially obtained in step 21 when performing the first iteration of the transmission stage 22, or a channel estimate CSI_DL as previously updated in accordance with the invention while performing an $i^{th}$ iteration of the transmission stage 22).

In order to validate reception of the payload data transmitted during step 221, the receiver transmits acknowledgment information ACK acknowledging the reception of payload data.

This acknowledgment information is used in this implementation of the invention to update the channel estimate CSI_DL during a step 222 of updating MAJ.

This updated channel estimate CSI_DL is then taken into account for transmitting the following payload data, during a following iteration of the transmission step 221, and so on.

More precisely, the step 222 of updating MAJ the channel estimate CSI_DL implements a step of estimating the uplink channel, also referred to as UL, corresponding to the downlink channel, on the basis of the acknowledgment information ACK transmitted by the receiver.

This estimation step delivers uplink channel estimate information written CSI_UL.

With reference to FIGS. 3, 4, 5, 6a, and 6b, there follows a description of several variants of this implementation of the invention for estimating the uplink channel from payload data acknowledgment information.

Thereafter there follows a description of an implementation of the invention for updating the downlink channel estimate on the basis of the corresponding uplink channel estimate, and also a description of how the updated channel estimate is used for transmitting payload data.

5.3 Estimating an Uplink Channel in One Implementation

5.3.1 First Variant: Receiver with One Antenna

Consideration is given to a first particular configuration in which a receiver uses only one receive antenna, and in which acknowledgments are transmitted via an uplink channel using that antenna on the same frequency band (e.g. 20 MHz) as the payload data transmitted by the transmitter via the corresponding downlink channel.

Figure 3:
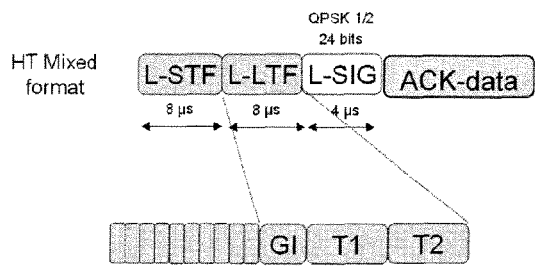
FIG. 3 shows an example of an acknowledgment frame of the MAC layer, in the prior art.

In this configuration, a "conventional" acknowledgment frame as shown in FIG. 3 can be used. For example, in the 802.11 standard, the pilots transmitted in the legacy long training field (L-LTF) may be used by the transmitter to estimate the uplink channel corresponding to the downlink channel over which it transmitted the payload data.

In the example shown in FIG. 3, the field L-LTF is made up of pilots (a set of pilots T1 duplicated as T2=T1), transmitted on each sub-carrier of the multi-carrier payload data acknowledgment signal.

Consideration is also given to a second particular configuration in which the receiver uses only one receive antenna, and in which acknowledgments are transmitted by said antenna over a frequency band different from that of the payload data transmitted by the transmitter.

Figure 4:
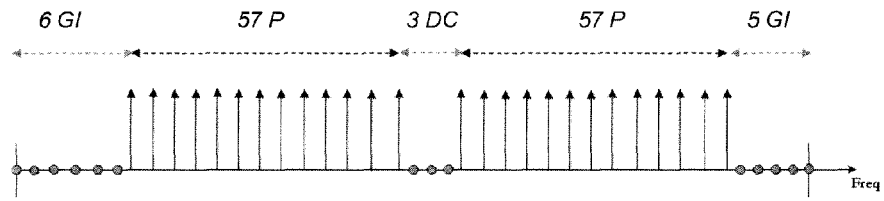
FIG. 4 shows an example of sub-carrier distribution for a payload data signal and an acknowledgment signal, in the prior art.
Figure 4:
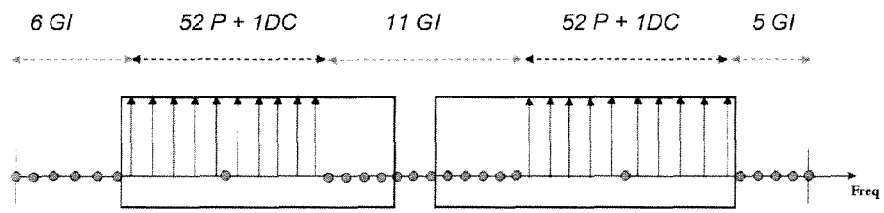

By way of example, this particular configuration may be encountered in the 802.11n or 802.11ac standard, when the payload data is transmitted via a downlink channel in a 40 MHz frequency band and the acknowledgments are transmitted via the corresponding uplink channel in a 2×20 MHz frequency band. Under such circumstances, the sub-carriers of the multi-carrier payload data signal are not distributed in the same manner as the sub-carriers of the multi-carrier acknowledgment signal, as shown in FIG. 4.

Thus, it may be observed that for a 40 MHz frequency band, the 128 sub-carriers that are used are distributed as follows:
- 114 sub-carriers are pilots P suitable for use in estimating the channel (or for payload data); and
- 14 sub-carriers are modulated by null values, referred to as null sub-carriers, three of them (DC) being situated in the middle of the frequency band, and the others (guard sub-carriers GI) being situated at the two edges of the frequency band, so as to limit spectrum overlap with other applications using neighboring frequency bands.

In contrast, for a 2×20 MHz frequency band, the 128 sub-carriers that are used are distributed as follows:
- 104 sub-carriers are pilots P suitable for estimating the channel (or for payload data); and
- 24 sub-carriers are null sub-carriers, two of them (DC) being situated in the middle of each 20 MHz frequency band, while the others (guard sub-carriers GI) are situated on two edges of each of the 20 MHz frequency bands, so as to limit spectrum overlap with other applications using neighboring frequency bands.

Thus, it can be seen that 11 sub-carriers cannot be estimated directly for the uplink channel.

For example, the two null sub-carriers in the middle of each 20 MHz frequency band may be estimated by frequency interpolation, from neighboring sub-carriers.

In contrast, for the nine sub-carriers situated in the middle of the 40 MHz band, frequency interpolation does not suffice for estimating them.

A first solution consists in implementing frequency interpolation while using only the sub-carriers on the "good" side of the 20 MHz frequency band, as represented by boxes in the figure. This frequency interpolation may be associated with time interpolation in order to make use of more correlated elements when estimating the missing sub-carriers. The advantage of this first solution is to avoid modifying the "conventional" acknowledgment frame as shown in FIG. 3.

A second solution consists in modifying the "conventional" acknowledgment frame by transmitting it, or at least transmitting the pilot symbols used for channel estimation, at 40 MHz instead of 2×20 MHz. Nevertheless, this solution is not fully compatible with old versions of the standard, e.g. the version 802.11a, and it may be penalizing for old generation stations, which then need to wait longer than the other stations before returning to a contention stage. When a station is not capable of detecting the data portion of a transmission (which will happen in this situation), acknowledgment protection is put into place and the station in question must wait for a duration (corresponding to transmitting an acknowledgment)

before being able to return to a contention stage. Since the packet in question is an acknowledgment, it is not itself followed by an acknowledgment and it is followed directly by a contention stage. A station that waits for the duration of another acknowledgment after the transmission of the acknowledgment will therefore be severely penalized.

Figure 1:
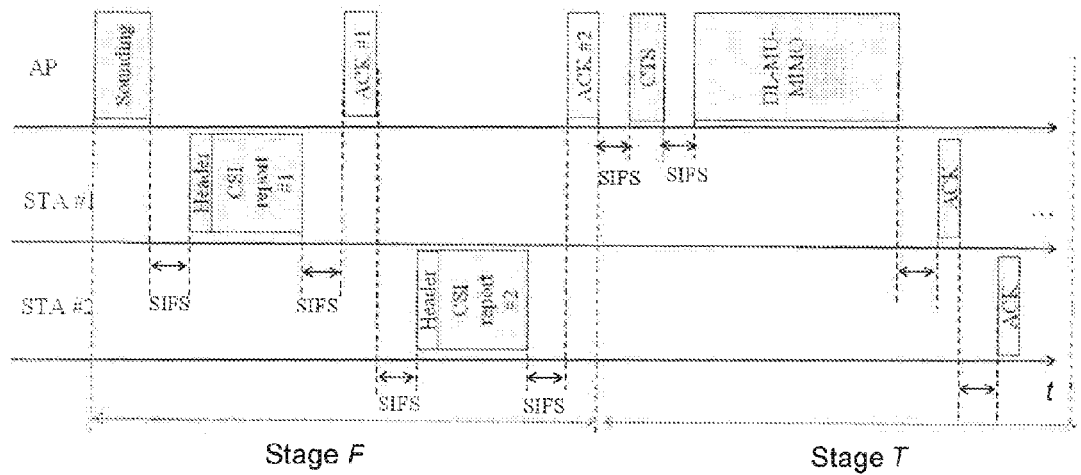
FIG. 1 shows an example of the stages needed for data transmission in a prior art SDMA technique.

Nevertheless, this solution may advantageously be used for all acknowledgments other than the acknowledgment that terminates a base element of the transmission stage, as described above with reference to FIG. 1.

A third solution consists in transmitting only the field L-LTF of the acknowledgment frame at 40 MHz, while transmitting the reminder of the acknowledgment frame at 2×20 MHz. This solution makes it possible to retain compatibility with old versions of the standard.

5.3.2 Second Variant: a Receiver with a Plurality of Antennas

Consideration is given below to the configuration in which the stations have more than one antenna each and can receive a plurality of streams in space division.

The invention makes it possible to estimate the downlink channel for each space-divided stream.

The channel estimation stage, e.g. using the feedback technique, involves transmitting special pilots for each space-divided stream in order to estimate the channel on which the space-divided stream is transmitted.

Nevertheless, the "conventional" acknowledgment is transmitted on only one space-divided stream, i.e. using only one antenna, or using a plurality of antennas while estimating (e.g. via the field L-LTF) only the "equivalent single-antenna channel" (as if only one antenna were being used).

The invention proposes several solutions for making it possible to estimate the downlink channel for each space-divided stream.

Consideration is given below to an example in which a receiver has two antennas.

Figure 5:
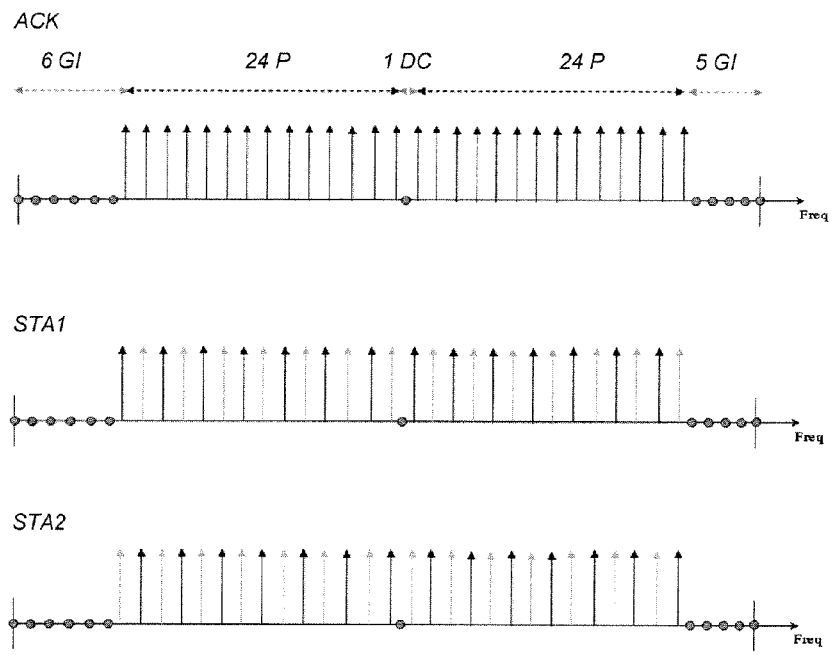
FIG. 5 shows an example of acknowledgment information in an implementation of the invention.

A first solution consists in transmitting the acknowledgment while using both antennas as follows: every other payload sub-carrier (P) is transmitted using the first antenna (STA1) and the other sub-carriers are transmitted by using the second antenna (STA2), as shown in FIG. 5 (only the bold sub-carriers are transmitted).

The transmitted acknowledgment (ACK) thus comprises a certain number of pilots (2×24 P) and of null carriers (1 DC, 6 GI and 5 GI).

At the access point, the uplink channels associated with the two antennas are estimated by distinguishing the sub-carriers representative of each of the channels.

Thus, the access point uses a first half of the sub-carriers, representative of the channel coming from the antenna STA1, in order to estimate the channel associated with the antenna STA1, and a second half of the sub-carriers, representative of the channel coming from the antenna STA2, in order to estimate the channel associated with the antenna STA2. Under such circumstances, the access point needs to be informed about the positions of the sub-carriers corresponding to the different antennas. A simple way is to define a transmission mode applying this solution in the standard and to signal the use of this mode in the signaling fields in the preamble of each transmission or in the beacons broadcast by the access point.

It should be observed that frequency interpolation needs to be performed in order to estimate the sub-carriers that are not transmitted by the antennas. This interpolation may be performed in the frequency domain (linear interpolation, MMSE, . . . ), or by converting to a transfer domain (using the discrete Fourier transform (DFT), or the discrete cosine transform (DCT), . . . ).

The access point makes this estimate for each of its antennas in order to estimate the uplink channel (CSI_UL) corresponding to the downlink channel. In the two-antenna configuration, the access point recovers the pilots transmitted over the sub-carriers corresponding to the first antenna (or respectively the second), estimates the channel on those various sub-carriers, and applies frequency interpolation to estimate the channel on the sub-carriers corresponding to the second antenna (or respectively the first).

It is possible to generalize this example to a number N of antennas by taking into consideration one sub-carrier out of every N instead of every other sub-carrier.

A second solution consists in modifying the acknowledgment frame in order to enable a plurality of uplink channels to be estimated.

Figure 6A:
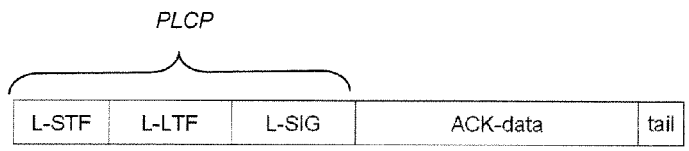
FIGS. 6a and 6b show respectively an example of an acknowledgment frame of the MAC layer in the prior art and an example of an acknowledgment frame as modified in an implementation of the invention.
Figure 6B:
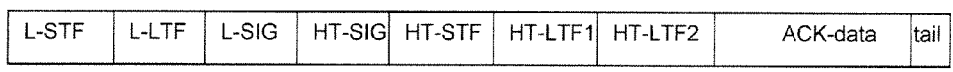

To do this, fields HT-LTFs are inserted, e.g. in the physical layer convergence procedure (PLCP) preamble (FIG. 6*a*), as shown in FIG. 6*b*. These fields (HT-LTF1 and HT-LTF2) serve respectively to estimate the uplink channel associated with the antenna STA1 and the uplink channel associated with the antenna STA2.

The operation and the symbols of the fields HT-LTFs may comply with the standard *IEEE P*802.11*n/D*11.0 *Draft standard for Information Technology—Telecommunications and information exchange between systems—Local and metropolitan area networks—Specific requirements Part* 11: *Wireless LAN Medium Access Control* (*MAC*) *and Physical Layer* (*PHY*) *specifications Amendment* 5: *Enhancements for Higher Throughput, Chapter* 20.3.9.4.6.

Nevertheless, this second solution is not entirely compatible with old versions of the standard, e.g. the version 802.11a, and may penalize old generation stations since they will need to wait for longer than other stations before returning to a contention stage, as explained above. This solution may advantageously be used for all acknowledgments other than the acknowledgment that terminates a base element of the transmission stage, as described above with reference to FIG. 1.

5.4 Using an Uplink Channel Estimate to Update a Corresponding Downlink Channel Estimate, in One Implementation

5.4.1 Updating a Downlink Channel Estimate

There follows a description applicable to one implementation of the invention, of how the estimate CSI_DL of the downlink channel is updated from the estimate CSI_UL of the corresponding uplink channel, as obtained in the manner described above.

It should be recalled that in digital terms, estimating a channel takes into consideration the analog components of the transmitter, the transmission through the air, and the analog components of the receiver. Only transmission through the air is identical in both directions (e.g. for the uplink channel UL and the downlink channel DL). It is therefore necessary to calibrate the response of the analog components in the uplink channel and the downlink channel in order to obtain perfect reciprocity for the channel.

Thus, it should be observed that the uplink channel estimate CSI_UL (obtained in the invention from acknowledgment information, as described above), is slightly different from the downlink channel estimate CSI_DL.

It is therefore necessary to take a calibration factor into account in order to be able to use the uplink channel estimate CSI_UL for updating the downlink channel CSI_DL and to take account of this updated downlink channel estimate CSI_DL when transmitting payload data.

It is considered that the downlink channel estimate CSI_DL can be written as follows:

$$CSI_{DL} = F_{DLR} \times H_{DL} \times F_{DLE}$$

where $H_{DL}$ is the matrix of coefficients representative of the channel, $F_{DLR}$ is the matrix of coefficients representative of the analog filters on reception, and $F_{DLE}$ is the matrix of coefficients representative of analog filters on transmission.

In the same manner, the uplink channel estimate CSI_UL can be written as follows:

$$CSI\_UL = F_{ULR} \times H_{UL} \times F_{ULE}$$

where $H_{UL}$ is the matrix of coefficients representative of the channel, $F_{ULR}$ is the matrix of coefficients representative of the analog filters on reception, and $F_{ULE}$ is the matrix of coefficients representative of the analog filters on transmission.

Furthermore, it is known that:

$$H_{UL} = H_{DL}^{-1}, F_{DLR} \neq F_{ULR}, \text{ and } F_{DLE} \neq F_{ULE}$$

It is initially assumed that during the first iteration of the transmission stage, i.e. during the first transmission of payload data, after the step of estimating the channel, e.g. by the feedback technique, that the channel has not been modified and that each user receives only the data transmitted over that user's beam (i.e. the beams do not generate any interference). Under such circumstances, the difference between the uplink channel estimate CSI_UL obtained by the invention and the downlink channel estimate CSI_DL obtained by the feedback technique corresponds to the difference between the filters representative of the analog components.

Thus, on the basis of CSI_UL and CSI_DL, it is possible to perform calibration in order to obtain the calibration factor $F_{CAL}$ such that:

$$CSI\_UL \times F_{CAL} = CSI\_DL$$

An example of a calibration technique is given in the standard *IEEE P802.11n/D11.0 Draft standard for Information Technology—Telecommunications and information exchange between systems—Local and metropolitan area networks—Specific requirements Part 11: Wireless LAN Medium Access Control (MAC) and Physical Layer (PHY) specifications Amendment 5: Enhancements for Higher Throughput, Chapter* 20.3.12.1.

This calibration factor $F_{CAL}$ is then used in the invention for updating the downlink channel estimate on the basis of the uplink channel estimate.

Thus, the updated downlink channel estimate is obtained by multiplying the uplink channel estimate by the calibration factor:

$$\text{updated } CSI\_DL = CSI\_UL \times F_{CAL}$$

It should be recalled that this updating step is implemented iteratively, on the basis of each acknowledgment transmitted by a receiver to acknowledge reception of payload data transmitted by a transmitter.

Thus, updating of the downlink channel estimate can be optimized by taking account of different values for the uplink channel estimate obtained during preceding iterations, or by performing linear prediction.

For example, provision may be made to perform time interpolation over the N preceding iterations:

$$\text{updated } CSI\_DL = \frac{\sum_{i}^{i=N} CSI\_DL_i}{N}$$

The updated downlink channel estimate can be then be used for transmitting the following payload data, e.g. in order to reconstruct the beams for SDMA transmission. All SDMA techniques make use, in their beamforming calculations, of the CSI_DL matrices.

The invention thus makes it possible to obtain an updated downlink channel estimate CSI_DL and to use it for constructing a new beam.

5.4.2 Duration of the Payload Data Transmission Stage/End of Iterations

The invention thus makes it possible to lengthen the duration of the payload data transmission stage between two stages of estimating the downlink channel by making use of an estimate of the corresponding uplink channel, and of a calibration factor that is determined during the first iteration of each transmission stage, as described above.

Nevertheless, it is necessary to implement a new channel estimation stage after a certain amount of time has elapsed, e.g. when updating the estimate by means of the invention is no longer capable of taking account of real variations of the channel.

Thus, it is possible to define an updating threshold beyond which it is necessary to perform a stage of estimating the downlink channel, before continuing to transmit payload data.

By way of example, this threshold may be representative of the difference between the current downlink channel estimate and the updated downlink channel estimate. Thus, when this difference becomes too great, i.e. when variation in the channel is too great, a new stage of estimating the downlink channel is performed.

Similarly, the calibration factor representative of differences between analog components on transmission and on reception is calculated during the first iteration of each transmission stage and does not take account of variations in the calibration (e.g. due to analog components heating up) that might occur during transmission.

It is thus possible to define a criterion relating to the calibration factor, as a function of which a new stage of estimating the downlink channel is performed before continuing to transmit payload data. For example, this criterion may be an external criterion, delivered by a temperature sensor and representative of a variation in analog components, and consequently representative of a variation in the calibration factor.

The invention also provides for taking account of a threshold for the level of interference observed by a receiver in the system. Thus, when a receiver observes that the level of interference received together with the signal that is being sent to the receiver exceeds a certain threshold, e.g. when the environment has changed (e.g. because a new signal is being transmitted to a neighboring user), it may signal this event, e.g. in the acknowledgment information. Under such circumstances, a new downlink channel estimation stage is performed before continuing to transmit payload data, in order to take account of the interference in the channel estimate.

Finally, if the transmitter no longer has any payload data to transmit for a certain length of time, it is preferable to implement a new channel estimation stage rather than to transmit the following payload data on the basis of an estimate updated in accordance with the invention. When the transmitter is no longer transmitting payload data, performing a feedback stage, for example, is not penalizing on overall transmission rate.

5.5 An Implementation

The invention may also be implemented in the context of an SDMA technique performing the first and second modes described with reference to the prior art.

In the second mode, which serves to cancel interference between users, the access point transmits pilot symbols to each user, thereby enabling the users to estimate the channel for the space-divided streams that are addressed thereto, together with pilot symbols enabling them to estimate the channels for space-divided streams addressed to other users. This second mode may be more robust against variations in the channel over time since it is capable of canceling the interference that is generated.

Under such circumstances, the invention makes it possible to obtain an updated estimate of the downlink channel prior to performing the second mode so as to be able to cancel interference on the basis of a channel estimate that is reliable because it has been updated in accordance with the invention, instead of relying on an initial channel estimate obtained during the feedback stage and that is no longer representative of the channel subjected to interference.

The decision to transition between the two modes may be made by the access point, e.g. taking account of the uplink channel estimate CSI_UL obtained in accordance with the invention.

In another implementation, the decision to perform a transition between the two modes may be taken by the receiver. Under such circumstances, the acknowledgment frame needs to be modified in order to create a field carrying this change-of-mode information. For example, a signaling bit in the physical layer (in the form of information hidden in the padding bits, e.g. as described in patent document No. 08/57014) or in the MAC layer (in the form of a new field in the acknowledgment frame).

5.6 Structure of the Transmitter

Figure 7:
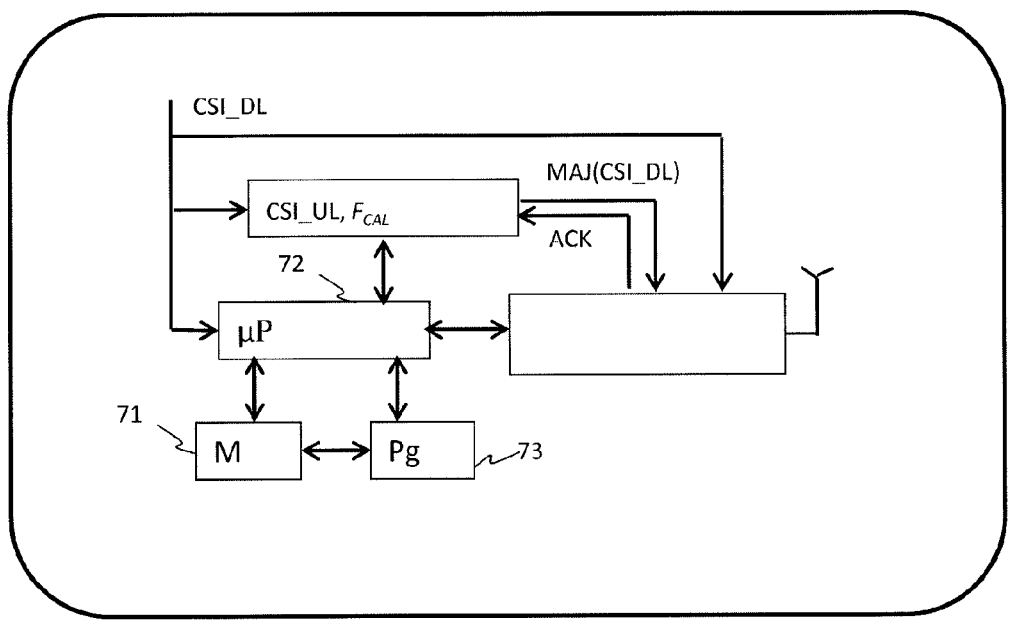
FIG. 7 shows the structure of a transmitter in a particular embodiment of the invention.

Finally, with reference to FIG. 7, there follows a description of a simplified structure for a transmitter in the particular implementation described above.

Such a transmitter has a memory 71 constituted by a buffer memory, a processor unit 72, e.g. fitted with a microprocessor µP, and controlled by a computer program 73, performing the transmission method of the invention.

On initialization, the code instructions of the computer program 73 may for example be loaded into a random access memory (RAM) before being executed by the processor of the processor unit 72. The processor unit 72 receives as input a downlink channel estimate CSI_DL. The microprocessor of the processor unit 72 performs the steps of the above-described transmission method in compliance with the instructions of the computer program 73 in order to update the downlink channel estimate CSI_DL. For this purpose, the transmitter includes, in addition to the buffer memory 71, means for transmitting payload data over the downlink channel, while taking account of the downlink channel estimate, and means for updating the downlink channel estimate, by taking account of information acknowledging reception of the payload data as transmitted by the receiver associated with the downlink channel. These means are controlled by the microprocessor of the processor unit 72.

The invention claimed is:

1. A method of transmitting a multi-carrier signal by a transmitter using at least two transmit antennas to at least one receiver using at least two receive antennas, the method comprising an obtaining step of obtaining an estimate of at least two transmission downlink channels, where a downlink channel is defined between one of said transmit antennas and one of said receive antennas;
   the method comprising a transmission stage performing at least one iteration of the following steps, for the at least two downlink channels:
   transmitting payload data over said downlink channel, while taking account of said downlink channel estimate;
   receiving acknowledgment information of said payload data, wherein said acknowledgment information is transmitted by the receiver associated with said downlink channels in the form of an acknowledgment frame of a data link layer known as the MAC layer comprising a channel estimate packet carrying at least two sets of pilots, each associated with a distinct receive antenna of said receiver;
   estimating the uplink channel for each of said uplink channels corresponding to each of said downlink channels on the basis of the sets of pilots carried by the said acknowledgment frame associated with the uplink channel;
   determining calibration factors by comparing said estimates of the downlink channels with said estimates of the uplink channels corresponding to said downlink channels, and
   updating downlink channel estimates on the basis of said uplink channel estimates and said calibration factors.

2. The transmission method according to claim 1, wherein said step of estimating the uplink channel delivers an estimate of a first portion of the frequency response of said uplink channel, and wherein said method comprises a step of frequency and/or time interpolation enabling a second portion of said frequency response to be estimated from said first portion.

3. A non-transitory computer program product comprising instructions for implementing the method according to claim 1 when the program is executed by a processor.

4. A transmitter for transmitting a multi-carrier signal to at least one receiver using at least two receive antennas, said transmitter using at least two transmit antennas and comprising means for obtaining an estimate of at least two transmission downlink channels, where a downlink channel is defined between one of said transmit antennas and one of said receive antennas;
   the transmitter further comprising the following means, activated at least once for at least two downlink channels in the form of one iteration:
   means for transmitting payload data over said downlink channels, taking account of said downlink channel estimates;
   means for receiving acknowledgment information of said payload data, wherein said acknowledgment information is transmitted by the receiver associated with said downlink channels, in the form of an acknowledgment frame of a data link layer known as the MAC layer comprising a channel estimate packet carrying at least two sets of pilots, each associated with a distinct receive antenna of said receiver;
   means for estimating the uplink channel for each of said uplink channels corresponding to said downlink channels on the basis of said acknowledgment frame associated with the uplink channel;

means for determining calibration factors by comparing said estimates of the downlink channels with said estimates of the uplink channels corresponding to said downlink channels and means for updating said downlink channel estimates on the basis of said uplink channel estimates and said calibration factors.

5. A reception method for receiving a signal corresponding to a multi-carrier signal transmitted by a transmitter using at least two transmit antennas and received by a receiver using at least two receiver antennas;

the method comprising at least one iteration of the following steps for at least two downlink channels, where a downlink channel is defined between one of said transmit antennas and one of said receive antennas:

receiving payload data on said downlink channels; and generating and transmitting acknowledgment information acknowledging reception of said payload data and enabling said transmitter to estimate the uplink channels corresponding to said downlink channels, wherein said generation step generates said acknowledgment information in the form of an acknowledgment frame of a data link layer known as the MAC layer, and comprises a channel estimate packet having at least two sets of pilots, each associated with a distinct receive antenna of said receiver.

6. The reception method according to claim 5, wherein the pilots of said sets of pilots are arranged in such a manner that, during said step of transmitting acknowledgment information, a pilot at a given frequency is transmitted at any given instant by a single one of said receive antennas.

7. The reception method according to claim 5, wherein said transmission step transmits at least a first portion of said acknowledgment frame over a 40 MHz frequency band, and transmits a second portion of said acknowledgment frame over two 20 MHz frequency bands, where appropriate.

8. A non-transitory computer program product comprising instructions for implementing the method according to claim 5 when the program is executed by a processor.

9. A reception method for receiving a signal corresponding to a multi-carrier signal transmitted by a transmitter using at least two transmit antennas and received by a receiver using at least two receiver antennas;

the method comprising at least one iteration of the following steps for at least two downlink channels, where a downlink channel is defined between one of said transmit antennas and one of said receive antennas:

receiving payload data on said downlink channels; and generating and transmitting acknowledgment information acknowledging reception of said payload data and enabling said transmitter to estimate the uplink channels corresponding to said downlink channels, wherein said generation step generates said acknowledgment information in the form of an acknowledgment frame of a data link layer known as the MAC layer, comprising a distinct channel estimate packet associated with each receive antenna of said receiver.

10. A receiver for receiving a signal corresponding to a multi-carrier signal transmitted by a transmitter using at least two transmit antennas, said receiver using at least two receive antennas;

the receiver comprising the following means that are activated in the form of an iteration at least once for at least two downlink channels, where a downlink channel is defined between one of said transmit antennas and one of said receive antennas:

means for receiving payload data on said downlink channels; and means for generating acknowledgment information in the form of an acknowledgment frame of a data link layer known as the MAC layer comprising a channel estimate packet having at least two sets of pilots, each associated with a distinct receive antenna of said receiver and means for transmitting said acknowledgment information acknowledging reception of said payload data making it possible for said transmitter to estimate uplink channels corresponding to said downlink channels.

\* \* \* \* \*